(12) United States Patent
Kishimoto

(10) Patent No.: US 12,741,663 B2
(45) Date of Patent: Sep. 22, 2026

(54) CONTROL DEVICE FOR VEHICLE

(71) Applicant: TOYOTA JIDOSHA KABUSHIKI KAISHA, Aichi-ken (JP)

(72) Inventor: Tatsuya Kishimoto, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 7 days.

(21) Appl. No.: 18/945,528

(22) Filed: Nov. 13, 2024

(65) Prior Publication Data

US 2025/0229796 A1 Jul. 17, 2025

(30) Foreign Application Priority Data

Jan. 17, 2024 (JP) ................................ 2024-005172

(51) Int. Cl.
*B60W 50/14* (2020.01)
*B60W 30/14* (2006.01)

(52) U.S. Cl.
CPC .......... *B60W 50/14* (2013.01); *B60W 30/143* (2013.01); *B60W 2050/146* (2013.01); *B60W 2540/215* (2020.02); *B60W 2552/15* (2020.02)

(58) Field of Classification Search
CPC ............... B60W 50/14; B60W 30/143; B60W 2050/146; B60W 2540/215; B60W 2552/15
See application file for complete search history.

(56) References Cited

U.S. PATENT DOCUMENTS

| | | | | |
|---|---|---|---|---|
| 8,355,851 | B2 | 1/2013 | Inoue et al. | |
| 8,370,040 | B2 | 2/2013 | Inoue et al. | |
| 8,417,430 | B2 | 4/2013 | Saeki | |
| 8,548,709 | B2 | 10/2013 | Morita | |
| 8,768,597 | B2 | 7/2014 | Kagawa | |
| 9,174,643 | B2 | 11/2015 | Aso | |
| 10,017,178 | B2 | 7/2018 | Morimoto et al. | |
| 10,118,617 | B2 | 11/2018 | Urano et al. | |
| 10,486,698 | B2 | 11/2019 | Masui et al. | |
| 2014/0200788 | A1* | 7/2014 | Eriksson | B60W 50/085 701/93 |
| 2017/0129492 | A1* | 5/2017 | Follen | B60W 50/0097 |
| 2018/0057003 | A1* | 3/2018 | Hyun | B60W 60/0016 |
| 2019/0135265 | A1* | 5/2019 | Shin | G01C 21/30 |
| 2019/0295419 | A1 | 9/2019 | Tosa et al. | |
| 2023/0347752 | A1* | 11/2023 | Vijaya Kumar | B60L 7/10 |
| 2024/0051535 | A1* | 2/2024 | Ando | B60W 30/18109 |

FOREIGN PATENT DOCUMENTS

| | | |
|---|---|---|
| JP | 2018-193017 A | 12/2018 |

* cited by examiner

*Primary Examiner* — Mohamed Barakat
(74) *Attorney, Agent, or Firm* — HAUPTMAN HAM, LLP

(57) ABSTRACT

A processor of an ECU includes: an uphill road determination unit that determines whether or not there is an uphill road continuing for a certain distance or more forward of a vehicle; a determination unit that determines whether or not a reaching time or a reaching distance required for the vehicle to enter the uphill road from a present position is equal to or lower than a predetermined value; and a notification unit that notifies, when the reaching time or the reaching distance becomes equal to or lower than the predetermined value, a driver of an activation proposal of activating a speed maintaining function.

7 Claims, 3 Drawing Sheets

CONTROL DEVICE FOR VEHICLE

CROSS-REFERENCE TO RELATED APPLICATION

This application claims priority to Japanese Patent Application No. 2024-005172 filed on Jan. 17, 2024, incorporated herein by reference in its entirety.

BACKGROUND

1. Technical Field

The disclosure relates to a control device for a vehicle.

2. Description of Related Art

Hitherto, there has been proposed a traffic-jam occurrence reduction traveling control method and a vehicle traveling control device that are capable of reducing or avoiding speed reduction in travel on an upslope or a sag section at the time of constant-speed travel on a highway, regardless of whether the driver's driving technique is good or bad (for example, Japanese Unexamined Patent Application Publication No. 2018-193017 (JP 2018-193017 A)).

SUMMARY

However, in the technology described in JP 2018-193017 A, since speed correction is performed after the speed reduction state is detected, a driver or a passenger of the vehicle may feel uncomfortable due to acceleration and deceleration.

Further, in the technology described in JP 2018-193017 A, since the speed correction is performed after the speed reduction state is detected, the speed correction is performed even when an upslope, a flat road, and a downslope successively appear in a short period, and there arises a problem in that the driver and the passenger feel strange due to the successive acceleration and deceleration.

Moreover, in the technology described in JP 2018-193017 A, since the speed correction is performed without notification to the driver, there is a possibility that the driver and the passenger feel anxiety unintentionally.

In view of the above-mentioned problems, an object of the present disclosure is to provide a control device for a vehicle that can activate a speed maintaining function of a vehicle without making an occupant of the vehicle feel uncomfortable or strange.

The gist of the present disclosure is as follows.

(1) A control device for a vehicle, including:

an uphill road determination unit that determines whether or not there is an uphill road continuing for a certain distance or more forward of the vehicle;

a determination unit that determines whether or not a reaching time or a reaching distance required for the vehicle to enter the uphill road from a present position is equal to or lower than a predetermined value; and a notification unit that notifies, when the reaching time or the reaching distance becomes equal to or lower than the predetermined value, a driver of an activation proposal of activating a speed maintaining function of the vehicle.

(2) The control device for a vehicle according to Item (1) above, further including a reception unit that receives a response of the driver with respect to the activation proposal, in which the notification unit ends notification of the activation proposal when the reception unit receives the response indicating refusal of the activation proposal, when the vehicle has entered the uphill road without reception of the response by the reception unit, or when a certain time has elapsed without reception of the response by the reception unit.

(3) The control device for a vehicle according to Item (1) above, further including:

a reception unit that receives a response of the driver with respect to the activation proposal; and a control unit that activates the speed maintaining function when the reception unit receives the response indicating acceptance of the activation proposal.

According to the present disclosure, the control device for a vehicle that can activate the speed maintaining function of the vehicle without making the occupant of the vehicle feel uncomfortable or strange is provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, several embodiments according to the present disclosure will be described with reference to the drawings. However, these descriptions are intended to be merely illustrative of preferred embodiments of the disclosure, and are not intended to limit the disclosure to such specific embodiments. It is to be noted that, in the following description, similar components are denoted by the same reference numbers.

Figure 1:
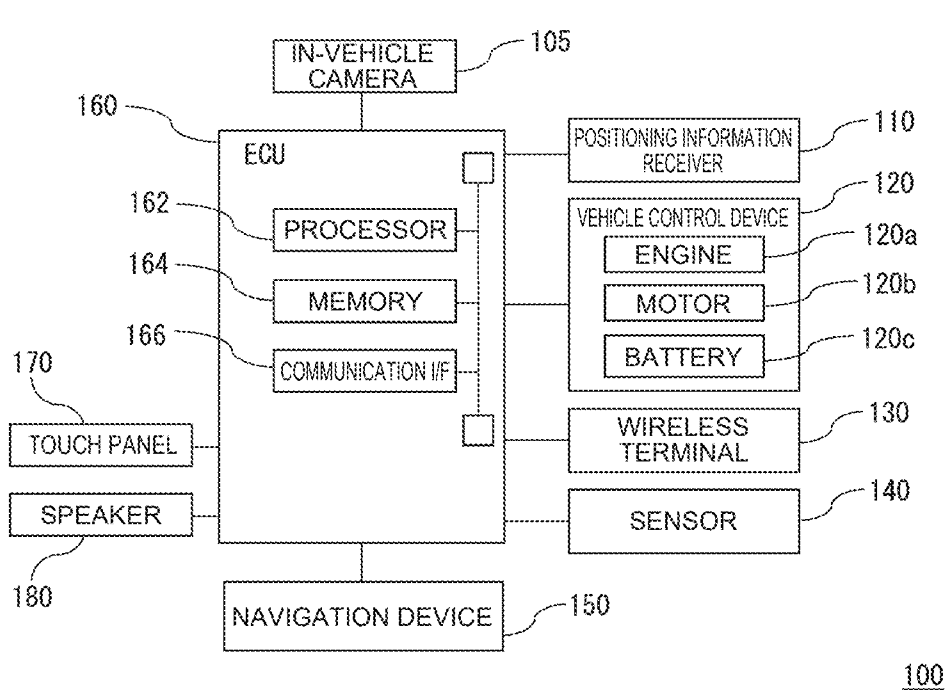
FIG. 1 is a schematic diagram illustrating a configuration of a vehicle control system installed on a vehicle.

FIG. 1 is a schematic diagram illustrating a configuration of a vehicle control system 100 installed on a vehicle, according to one embodiment of the present disclosure. The vehicle control system 100 includes an in-vehicle camera 105, a positioning information receiver 110, a vehicle control device 120, a wireless terminal 130, one or more sensors 140, a navigation device 150, an electronic control device (hereinafter referred to as "ECU") 160, a touch panel 170, and a speaker 180. The components are connected to each other via a vehicle internal network to allow communication therebetween.

The in-vehicle camera 105 includes a two-dimensional detector configured of an array of photoelectric conversion elements having sensitivity to visible light, such as a CCD or a C-MOS, and an imaging optical system that forms an image of a region to be photographed on the two-dimensional detector. The in-vehicle camera 105 is provided on a dashboard inside of the vehicle or near a windshield, for example, and photographs a region around the vehicle for each predetermined photographing period (for example, 1/30 seconds to 1/10 seconds) to generate an image representing the region around the vehicle. The in-vehicle camera 105 may be configured of a stereo camera, and may be configured to acquire a distance to each structure on the image based on parallax of left and right images. The in-vehicle camera 105 outputs the generated image to the ECU 160 via the vehicle internal network every time the image is generated.

The positioning information receiver 110 acquires positioning information indicating the current position and the posture of the vehicle. For example, the positioning information receiver 110 can be a global positioning system (GPS) receiver. The positioning information receiver 110 outputs the acquired positioning information to the ECU 160 via the vehicle internal network every time the positioning information is received.

The vehicle control device 120 is various devices relating to vehicle control, and includes an engine 120*a* and a motor 120*b* that serve as a drive source that causes the vehicle to travel, and a battery 120*c* that stores electric power. Further, the vehicle control device 120 includes a steering device, a braking device, a transmission, and the like. It is to be noted that FIG. 1 exemplifies a case in which the vehicle is a PHEV, but when the vehicle is an EV, the vehicle control device 120 includes no engine 120*a*. Further, when the vehicle is an engine vehicle, the vehicle control device 120 is not required to include the motor 120*b*.

The wireless terminal 130 performs communication with the outside with use of a wireless communication network such as 4G or 5G, for example. The one or more sensors 140 include a sensor that monitors a region around the vehicle, for example, a sensor such as Light Detection and Ranging (Lidar) or a radar.

The navigation device 150 obtains a scheduled traveling route from the present location of the vehicle to a moving destination in accordance with a predetermined route search method such as a Dijkstra method. Accordingly, the navigation device 150 includes a memory that stores map information. It is to be noted that the map information may be stored in a memory 164 of the ECU 160. The map information includes information on an uphill road such as the position of the uphill road, the slope (gradient) of the uphill road, and the distance for which the uphill road continues. The map information may be updated based on update information received from an external server by the wireless terminal 130.

The ECU 160 includes a processor 162, the memory 164, and a communication interface 166. The processor 162 includes one or more central processing units (CPUs) and a peripheral circuit thereof. The processor 162 may further include other arithmetic circuits such as a logical operation unit, a numerical operation unit, or a graphic processing unit. The processor 162 provides a function corresponding to a predetermined object by executing a computer program loaded to be executable in a work area of the memory 164. The memory 164 includes, for example, a volatile semiconductor memory and a non-volatile semiconductor memory. The memory 164 stores various pieces of information. The communication interface 166 includes an interface circuit that connects the ECU 160 to the vehicle internal network.

The touch panel 170 is configured of, for example, a liquid crystal display (LCD) and a touch sensor, and is provided in a meter panel or near a dashboard, for example. The notification to the driver of the vehicle is output by being displayed on the liquid crystal display. Further, the touch panel 170 detects an operation of the driver by the touch sensor. Examples of the operation of the driver include an operation to turn on an ACC and an operation to respond to an ACC activation proposal. The speaker 180 outputs the notification to the driver of the vehicle by sound.

Figure 2:
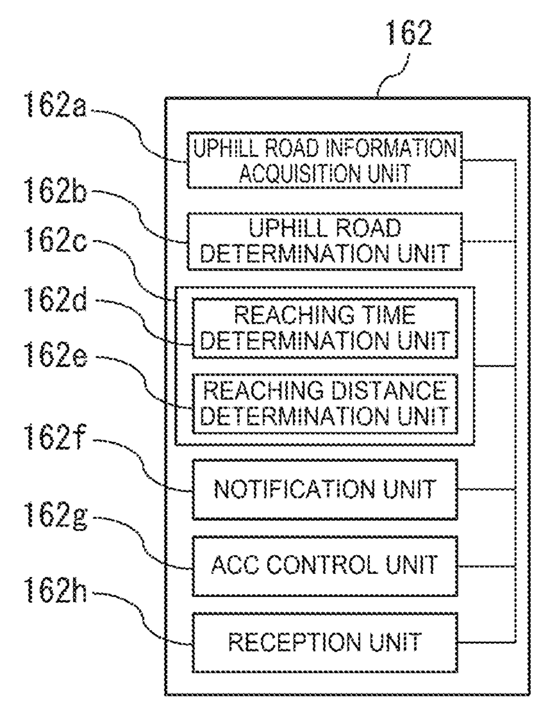
FIG. 2 is a schematic diagram illustrating functional blocks of a processor of an ECU included in the vehicle.

FIG. 2 is a schematic diagram illustrating functional blocks of the processor 162 of the ECU 160 included in the vehicle. The processor 162 is one aspect of the control device for a vehicle, and includes an uphill road information acquisition unit 162*a*, an uphill road determination unit 162*b*, a determination unit 162*c*, a notification unit 162*f*, an adaptive cruise control (ACC) control unit 162*g*, and a reception unit 162*h*. The determination unit 162*c* further includes a reaching time determination unit 162*d* and a reaching distance determination unit 162*e*. Each of the units included in the processor 162 is, for example, a functional module to be implemented by a computer program operated on the processor 162. That is, each of the units included in the processor 162 is configured of the processor 162 and a program (software) that causes the processor 162 to function. Further, the program may be stored in the memory 164 of the ECU 160 or a storage medium connected from the outside. As another example, each of the units included in the processor 162 may be a dedicated arithmetic circuit provided in the processor 162.

The uphill road information acquisition unit 162*a* acquires the information on the uphill road from the map information. Specifically, the uphill road information acquisition unit 162*a* acquires, based on the present position of the vehicle acquired by the positioning information receiver 110 and the scheduled traveling route obtained by the navigation device 150, information such as the position of the uphill road present in the scheduled traveling route, the slope of the uphill road, and the distance for which the uphill road continues.

The uphill road determination unit 162*b* determines, based on the information on the uphill road acquired by the uphill road information acquisition unit 162*a* and the present position of the vehicle, whether or not there is an uphill road continuing for a certain distance or more forward of the vehicle. The uphill road determination unit 162*b* may determine whether or not an uphill road having a slope of a predetermined value or more continues for a certain distance or more forward of the vehicle.

When the uphill road determination unit 162*b* determines that there is an uphill road continuing for a certain distance or more forward of the vehicle, the determination unit 162*c* determines whether or not the reaching time or the reaching distance required for the vehicle to enter the uphill road from the present position is equal to or lower than a predetermined value. The determination unit 162*c* may determine whether or not the reaching time or the reaching distance required for the vehicle to enter the uphill road from the present position is equal to or lower than a predetermined value when the uphill road determination unit 162*b* determines that an uphill road having a slope of a predetermined value or more continues for a certain distance or more forward of the vehicle.

More specifically, the reaching time determination unit 162*d* of the determination unit 162*c* acquires, based on the information on the uphill road, the present position of the vehicle, and a vehicle speed, the reaching time required for the vehicle to enter the uphill road from the present position, and determines whether or not the reaching time is equal to or lower than a first predetermined value. Further, the reaching distance determination unit 162*e* of the determination unit 162*c* acquires, based on the information on the uphill road and the present position of the vehicle, the reaching distance required for the vehicle to enter the uphill road from the present position, and determines whether or not the reaching distance is equal to or lower than a second predetermined value.

The notification unit **162*f* notifies, when the reaching time or the reaching distance required for the vehicle to enter the uphill road from the present position becomes equal or lower than the predetermined value, the driver of an activation proposal of activating a speed maintaining function of the vehicle, that is, the ACC. Specifically, the notification unit 162*f* outputs a notification of proposing activation of the ACC from the touch panel 170 or the speaker 180**.

The notification unit **162*f*** ends the notification of the activation proposal when the response indicating refusal of the ACC activation proposal is received, when the vehicle has entered the uphill road without reception of the response with respect to the ACC activation proposal, or when a certain time has elapsed without reception of the response with respect to the ACC activation proposal. Thus, the driver is prevented from feeling uncomfortable by the continuous notification of the activation proposal.

When the response indicating acceptance of the ACC activation proposal is received, the ACC control unit **162*g* activates the ACC to control the vehicle control device 120 such as the engine 120*a*, the motor 120*b*, and the braking device by the ACC. Specifically, the ACC control unit 162*g* controls the vehicle control device 120 such that the vehicle automatically travels at a vehicle speed set by the driver. Further, the ACC control unit 162*g* controls, based on an image generated by the in-vehicle camera 105, information detected by the sensor that monitors the region around the vehicle, and the like, the vehicle control device 120** such that the vehicle travels while maintaining an inter-vehicle distance with a preceding vehicle. Thus, when the vehicle enters the uphill road, the driver and the passenger are prevented from feeling uncomfortable due to needless acceleration and deceleration. It is to be noted that the speed maintaining function according to this embodiment may include both of a function of causing the vehicle to automatically travel at a vehicle speed set by the driver and a function of causing the vehicle to travel while maintaining an inter-vehicle distance with a preceding vehicle, but the speed maintaining function may be only one of the functions, and for example, only the function of causing the vehicle to automatically travel at a vehicle speed set by the driver.

The reception unit **162*h* receives the response of the driver with respect to the ACC activation proposal. The response is detected by the touch panel 170**.

Figure 3:
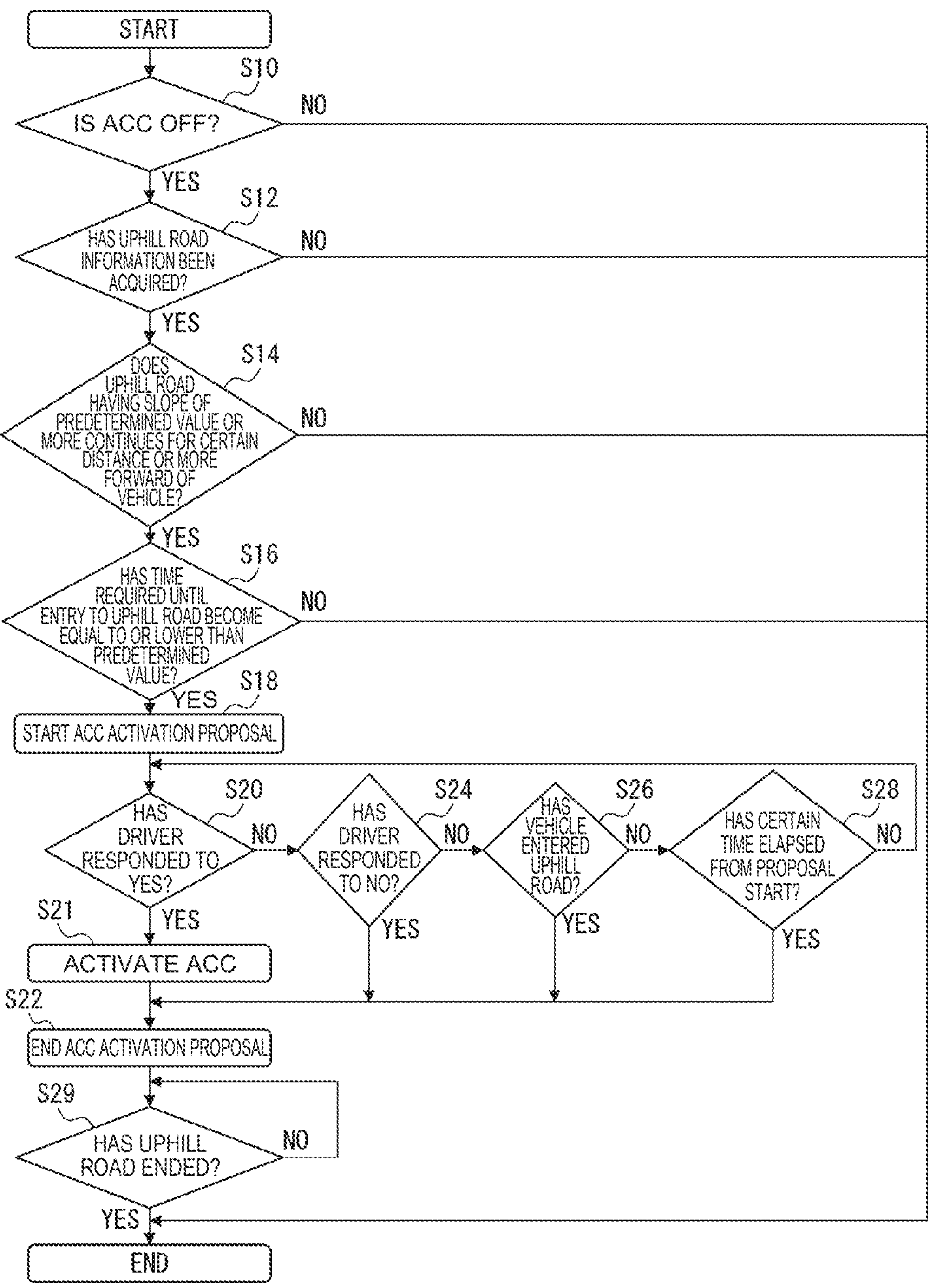
FIG. 3 is a flowchart illustrating processing to be performed by the processor of the ECU.

FIG. 3 is a flowchart illustrating processing to be performed in each predetermined control period by the processor 162 of the ECU 160. First, whether or not the ACC is off (OFF) is determined (Step S10). When the ACC is off (OFF), the uphill road information acquisition unit **162*a* determines whether or not the information on the uphill road has been acquired (Step S12**).

When it is determined in Step S12 that the information on the uphill road has been acquired, the uphill road determination unit **162*b* determines whether or not an uphill road having a slope of a predetermined value or more continues for a certain distance or more forward of the vehicle (Step S14). When the uphill road having a slope of a predetermined value or more continues for a certain distance or more forward of the vehicle, the reaching time determination unit 162*d* determines whether or not the reaching time required for the vehicle to enter the uphill road has become equal to or lower than the predetermined value (Step S16). It is to be noted that, in Step S16, the reaching distance determination unit 162*e*** may determine whether or not the reaching distance required for the vehicle to enter the uphill road has become equal to or lower than the predetermined value.

When the reaching time has become equal to or lower than the predetermined value in Step S16, the notification unit **162*f* starts notification of the ACC activation proposal to the driver (Step S18). Thus, on a screen of the touch panel 170**, such a notification that "There is an uphill road ahead. Do you want to activate ACC?" is displayed.

Further, together with the notification of the ACC activation proposal, "YES" and "NO" buttons are displayed on the screen of the touch panel 170. Thus, the driver is asked to determine whether to activate the ACC, and the response of the driver is received such that the driver's intention is appropriately reflected.

As described above, when an uphill road having a slope of a predetermined value or more continues for a certain distance or more forward of the vehicle, the notification of the ACC activation proposal is given. Thus, the notification of activation proposal is not given when a short uphill road is present forward of the vehicle, and the opportunity to make the driver feel troublesome is reduced. Further, when short upslope and downslope arc successive, no notification of the activation proposal is given, and the ACC is not activated. Thus, the vehicle does not enter the downslope while maintaining the present vehicle speed by the ACC, and the opportunity to make the driver feel strange is reduced.

Next, it is determined whether or not the driver who has visually recognized the notification of the ACC activation proposal on the screen of the touch panel 170 has pressed the "YES" button on the screen of the touch panel 170 (Step S20). When it is determined that the driver has pressed the "YES" button, the ACC is activated (Step S21), and the notification unit **162*f* ends the notification of the ACC activation proposal (Step S22**).

As described above, the ACC is turned on when the driver accepts the ACC activation proposal, and hence the speed correction is not performed without notification to the driver, and the driver is prevented from feeling strange. Further, when the driver accepts the ACC activation proposal, the ACC is activated before the speed is reduced on the uphill road. Thus, the vehicle enters the uphill road while the vehicle speed is maintained at constant speed. Thus, the driver is prevented from feeling uncomfortable due to needless acceleration and deceleration, and the vehicle traveling behind is prevented from decelerating due to the deceleration of the own vehicle at the time of entering the uphill road or passing a sag section, for example.

When it is determined in Step S20 that the driver has not pressed the "YES" button on the screen of the touch panel 170, it is determined whether or not the driver has pressed the "NO" button on the screen of the touch panel 170 (Step S24).

When it is determined in Step S24 that the driver has pressed the "NO" button on the screen of the touch panel 170, the notification unit **162*f* ends the notification of the ACC activation proposal (Step S22**).

When it is determined in Step S24 that the driver has not pressed the "NO" button on the screen of the touch panel 170, it is determined based on the information on the uphill road and the present position of the vehicle whether or not the vehicle has entered the uphill road (Step S26). When it is determined in Step S26 that the vehicle has entered the uphill road, the notification unit **162*f* ends the notification of the ACC activation proposal (Step S22**).

When it is determined in Step S26 that the vehicle has not entered the uphill road, it is determined whether or not a certain time has elapsed from when the notification of the ACC activation proposal has started (Step S28). When the certain time has elapsed, the notification unit **162*f* ends the notification of the ACC activation proposal (Step S22). Meanwhile, when the certain time has not elapsed, the process returns to the processing of Step S20**.

After Step S22, it is determined based on the information on the uphill road and the present position of the vehicle whether or not the uphill road has ended, that is, the vehicle has passed the uphill road (Step S29). When the uphill road ends, the processing in the control period ends. The processing above is repeated in each predetermined control period, and thus the notification of the ACC activation proposal is performed each time with respect to the uphill road sequentially approaching the vehicle.

It is to be noted that, when the ACC is on (ON) in Step S10, when the information on the uphill road has not acquired in Step S12, when an uphill road having a slope of a predetermined value or more does not continue for a certain distance or more forward of the vehicle in Step S14, or when the reaching time required for the vehicle to enter the uphill road exceeds the predetermined value in Step S16, the processing in the control period is ended.

As described above, according to this embodiment, the driver is notified of the ACC activation proposal only when the uphill road continues for a certain distance. Thus, no activation proposal notification is given when a short uphill road is present forward of the vehicle, and the opportunity to make the driver feel strange is reduced. Further, the ACC is turned on when the driver accepts the ACC activation proposal, and hence the speed correction is not performed without notification to the driver. Thus, the driver is prevented from feeling strange, and the driver and the passenger are prevented from feeling uncomfortable due to needless acceleration and deceleration.

Further, the driver is notified of the ACC activation proposal only when the uphill road continues for a certain distance. Thus, when short upslope and downslope are successive, the vehicle does not enter the downslope while maintaining the present vehicle speed in a state in which the ACC is activated, and the opportunity to make the driver and the passenger feel strange is reduced. Moreover, the driver is notified of the ACC activation proposal only when the uphill road continues for a certain distance. Thus, when the short upslope and downslope are successive, the driver is not repeatedly notified of the activation proposal in a short period, and the opportunity to make the driver feel bothered is reduced.

Modification Example

Figure 4:
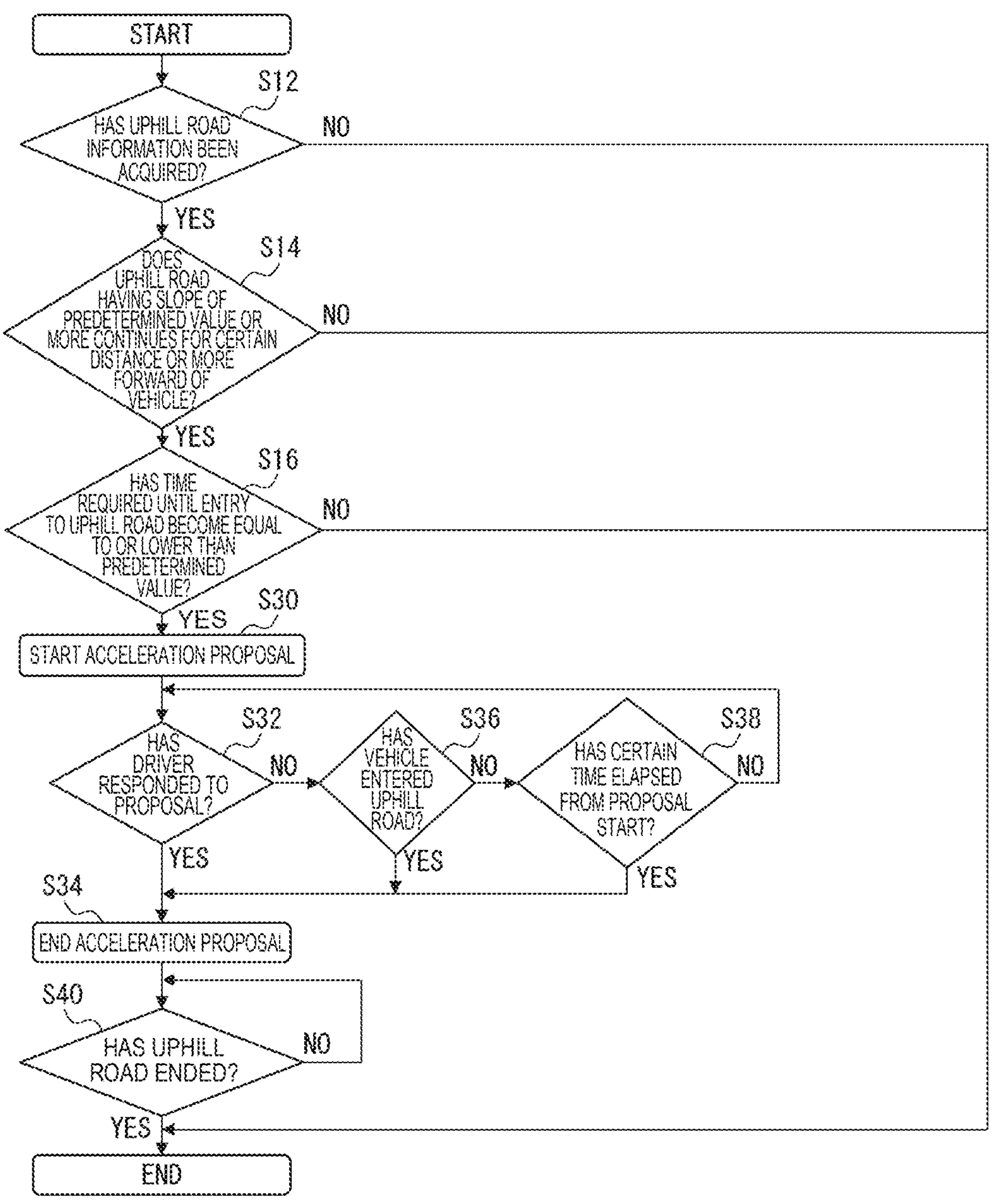
FIG. 4 is a flowchart illustrating processing to be performed by the processor of the ECU.

FIG. 4 is a flowchart illustrating processing of a case in which, in the processing of FIG. 3, when the vehicle does not have the function of the ACC, instead of proposing activation of the ACC to the driver, acceleration of the vehicle is proposed.

In FIG. 4, the processing steps of Steps S12, S14, and S16 are similar to those of FIG. 3. When the reaching time has become equal to or lower than the predetermined value in Step S16, the notification unit 162*f* notifies the driver of a vehicle acceleration proposal (Step S30). Thus, such a notification that "There is an uphill road ahead. It is recommended to accelerate the vehicle." is displayed on the screen of the touch panel 170. Further, a button of "CONFIRMED" is displayed on the screen of the touch panel 170.

Next, it is determined whether or not the driver who has visually recognized the notification of the acceleration proposal on the screen of the touch panel 170 has responded to the proposal, that is, whether or not the driver has pressed the button of "CONFIRMED" on the screen of the touch panel 170 (Step S32). When it is determined that the driver has pressed the button of "CONFIRMED", the notification unit 162*f* ends the notification of the acceleration proposal (Step S34).

When it is determined in Step S32 that the driver has not pressed the button of "CONFIRMED" on the screen of the touch panel 170, it is determined based on the information on the uphill road and the present position of the vehicle whether or not the vehicle has entered the uphill road (Step S36). When it is determined in Step S36 that the vehicle has entered the uphill road, the notification unit 162*f* ends the notification of the acceleration proposal (Step S34).

When it is determined in Step S36 that the vehicle has not entered the uphill road, it is determined whether or not a certain time has elapsed from when the notification of the acceleration proposal has started (Step S38). When the certain time has elapsed, the notification unit 162*f* ends the notification of the acceleration proposal (Step S34). Meanwhile, when the certain time has not elapsed, the process returns to the processing of Step S32.

It is to be noted that, in Step S30, together with the acceleration proposal, similarly to Step S18 of FIG. 3, the "YES" and "NO" buttons may be displayed on the screen of the touch panel 170, and, in the subsequent processing, similarly to Steps S20 and S24 of FIG. 3, processing may be performed according to acceptance or refusal of the driver with respect to the acceleration proposal.

After Step S34, it is determined based on the information on the uphill road and the present position of the vehicle whether or not the uphill road has ended, that is, whether or not the vehicle has passed the uphill road (Step S40). When the uphill road ends, the processing in the control period ends. The processing above is repeated in each predetermined control period, and thus the notification of the acceleration proposal is performed each time with respect to the uphill road sequentially approaching the vehicle.

What is claimed is:

1. A control device for a vehicle, the control device comprising:

a processor configured to:

determine whether or not there is an uphill road continuing for a certain distance or more forward of the vehicle;

determine, in response to determining that there is the uphill road forward of the vehicle, whether or not a reaching time or a reaching distance required for the vehicle to enter the uphill road from a present position is equal to or lower than a predetermined value;

notify, in response to the reaching time or the reaching distance becoming equal to or lower than the predetermined value, a driver of an activation proposal of activating a speed maintaining function of the vehicle;

receive a response of the driver with respect to the activation proposal; and end notification of the activation proposal in response to determining that the vehicle has entered the uphill road without reception of the response, wherein the processor is further configured to not notify, in response to the uphill road not continuing for the certain distance, the driver of the activation proposal.

2. The control device according to claim 1 wherein the processor is further configured to activate the speed maintaining function in response to receiving the response indicating acceptance of the activation proposal.

3. The control device according to claim 1, wherein the processor is configured to, only when the uphill road has a slope of a predetermined value or more and continues for the certain distance or more, determine that the uphill road continuing for the certain distance or more forward of the vehicle exists.

4. The control device according to claim 1, wherein the processor is further configured to activate, in response to receiving the response indicating acceptance of the activation proposal and before a speed of the vehicle is reduced on the uphill road, the speed maintaining function.

5. The control device according to claim 4, wherein the processor is further configured to, in response to the uphill road having a slope of a predetermined value or more and continuing for the certain distance or more, determine that the uphill road continuing for the certain distance or more forward of the vehicle exists.

6. The control device according to claim 5, further comprising a memory storing map information, wherein the processor is further configured to acquire the slope of the uphill road from the map information.

7. The control device according to claim 5, wherein the processor is further configured to acquire the slope of the uphill road based on a present position of the vehicle and a scheduled traveling route.

* * * * *